UNITED STATES PATENT OFFICE.

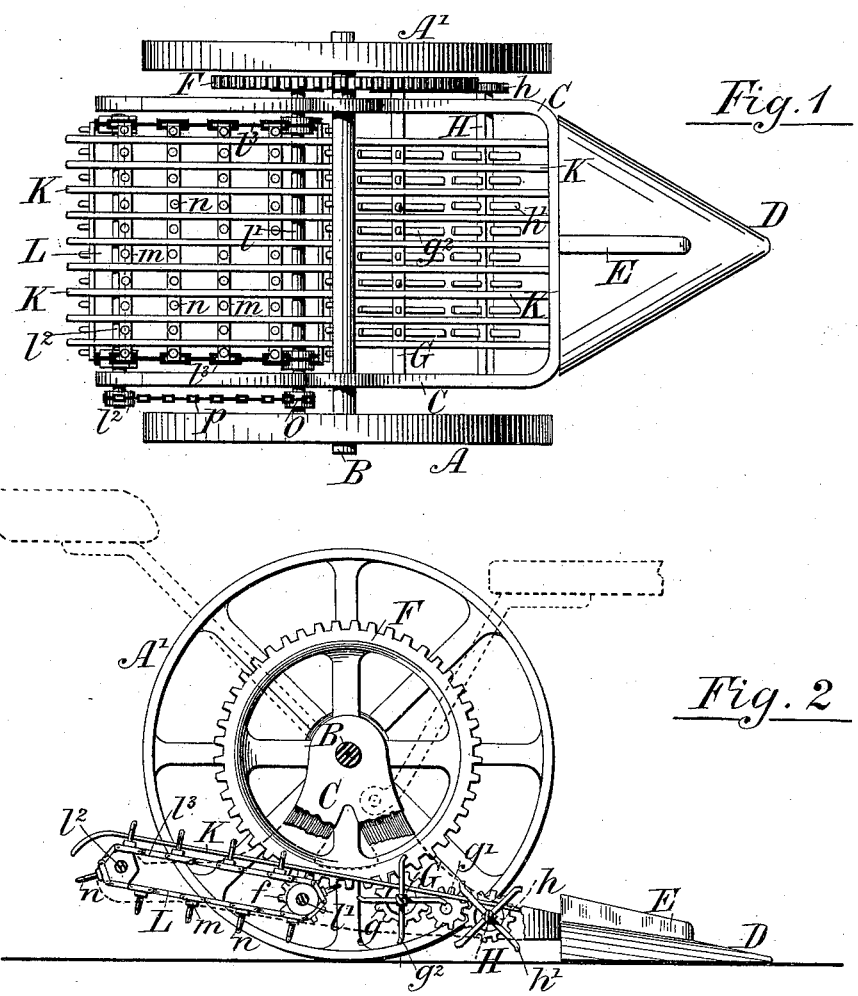

HIRAM DAVID BINKLEY, OF DUNDAS, ONTARIO, CANADA.

POTATO-DIGGER.

SPECIFICATION forming part of Letters Patent No. 376,229, dated January 10, 1888.

Application filed October 30, 1886. Serial No. 217,626. (No model.)

*To all whom it may concern:*

Be it known that I, HIRAM DAVID BINKLEY, of the town of Dundas, in the county of Wentworth and Province of Ontario, in the Dominion of Canada, have invented certain new and useful Improvements in Machines for Digging Potatoes; and I do hereby declare that the following is a full, clear, and exact description of the same.

The object of my invention is to produce a machine for digging and picking potatoes which shall perform its work thoroughly, without complication of mechanism, and one which shall consist of the fewest possible parts, arranged in such manner and of such strong construction that the aid of a skilled mechanic shall not be necessary to keep same in running order. The machine at the same time is light of draft and cheap in first cost.

To this end the machine consists usually of a light frame carried by two wheels arranged to run in the furrow on each side of the hill, said frame carrying a digging blade or share forward of the wheels, and separating-bars running backward from the share, over which the potatoes and soil will pass. Operated by a suitable train of gears in connection with the axle, I arrange one or more transverse picker-shafts, which revolve in the opposite direction to the wheels, or toward the rear of the machine, the teeth or prongs of said picker-shafts projecting up between the bars, and serving, as the machine moves forward, to disintegrate the mass raised by the share, and thus separate the potatoes from the soil, the former being carried to the rear of the machine and the latter sifting through the bars. Provision is also made in my machine for the attachment of a short elevator or separating-carrier just behind the picker-shafts, said elevator being placed underneath the separating-bars, and having fingers projecting upward between same, adapted to draw the potatoes over the bars to the rear, while completing the separation of the soil therefrom. This will be particularly valuable for work in clayey or heavy soil.

For full comprehension of my improvements reference must be had to the accompanying drawings, forming part of this specification, in which similar letters of reference indicate like parts.

In said drawings, Figure 1 is a plan view of my machine; Fig. 2, a side view of same, partly in section, one wheel and part of both sides of the frame being removed.

A A' are the wheels, B the axle, and C the frame hung from the axle, all being of any suitable construction.

A driver's seat and tongue can be provided, as shown by dotted lines; or plow-handles can be attached to the frame, if desired, as well as mold-boards for cutting the sides of the row, none of these forming any part of my invention.

D is the digging blade or share carried by the forward end of the frame, this share being preferably provided with a vertical web, E, on its upper side, with the blunt edges to assist in breaking up the row. The bottom of the share is preferably flat and its upper side slightly convex.

F is a large gear affixed to the axle, and driving smaller gears, $f$ $g$, both intermeshing therewith. The gear $g$ drives an intermediate gear, $g'$, and this in turn meshes with another gear, $h$, said gears $g$ and $h$ being mounted on the ends of picker-shafts G and H, and arranged to rotate them in the opposite direction to that at which the wheels move, so as to cause the fingers or prongs $g^2$ $h'$, carried on these shafts, to throw the potatoes toward the rear of the machine.

K K are a number of parallel bars, affixed at their forward ends either to the rear of the share D or to a bar of the frame C, which may be turned round at the front, as shown. As illustrated in Fig. 2, these bars K may run right back over all the picking or separating devices to the extreme rear of the machine.

The fingers of the picker-shafts are rounded, or partly so, and have their points turned back, as shown in the drawings, so as not to break the skin of the potatoes, and the separating-bars will be made smooth for the same purpose.

The bars K lie just close enough to the shafts G H to allow the latter to revolve freely, and the pickers, fingers, or prongs $g^2$ $h'$ pass up through the interstices, and thus move through the mass raised by the share and clear the potatoes as the machine travels forward.

L is a short elevator or carrier arranged behind the picker-shafts and underneath the bars K. It is made up of two pulley-shafts, $l'\ l^2$, journaled in the frame C, (or in a special frame attached to C,) side chains, $l^3\ l^3$, running over said pulleys and carrying cross bars or slats $m\ m$. On these cross-slats are fixed outwardly-projecting teeth or prongs $n$, somewhat similar to those on the picker-shafts, and these teeth or prongs, projecting at the upper side of the elevator between the bars K, serving, as the traveler moves, to carry the potatoes to the rear after finishing the work of separating the soil therefrom. A box may be provided to receive the potatoes, or they may fall upon the ground. This elevator, carrier, or traveler is driven from the large gear F through the gear $f$, (already mentioned,) which is mounted on the pulley-shaft $l'$, this latter also carrying a small chain-pulley, $o$, from which a driving-chain, $p$, passes to the rear pulley-shaft, $l^2$.

From the above it will be seen that by a very simple arrangement I produce a machine which can be easily adapted for use simply as a digger or as a combined digger and picker, the farmer being enabled to make the required changes without employing a special mechanic.

I am aware that a picker-shaft revolving in the same direction as the wheels is not new in a potato-digging machine; and I am also aware that converging lines have been previously attached to a digging-blade; and I am, furthermore, cognizant of the fact that an elevator working underneath separating-bars has been used, and therefore do not claim either of these elements in themselves.

A particular and essential element in my invention is that at least the forward picker-shaft shall work at approximately the same level as the digging-blade, in order that the soil and potatoes shall pass over the pickers or separators—that is to say, over the bars covering these and the elevators—and these picking devices should invariably revolve upward and backward through the mass in effecting the separation.

Having thus described my invention, I beg to state that what I claim, and desire to secure by Letters Patent, is as follows:

In a potato-digging machine, the combination, with the wheels and the frame, of the digging-blade D, picker-shafts G H, elevator-shafts $l'\ l^2$, a train of gears driven from one of the wheels, elevator L, having teeth or prongs $n$, and separating-bars K, extending from said digging-blade over said pickers and elevators in such manner that their prongs may work between said bars, substantially as and for the purpose specified.

Toronto, October 2, 1886.

HIRAM DAVID BINKLEY.

Witnesses:
R. A. KELLOND,
F. R. CAMERON.